United States Patent
Patel et al.

(10) Patent No.: US 10,460,861 B1
(45) Date of Patent: Oct. 29, 2019

(54) HIGH SPEED ROTOR CONNECTION ASSEMBLY

(71) Applicant: Hamilton Sundstrand Corporation, Charlotte, NC (US)

(72) Inventors: Dhaval Patel, Schaumburg, IL (US); Edward C. Allen, Davis, IL (US); Andrew R. Wilkinson, Cherry Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/173,324

(22) Filed: Oct. 29, 2018

(51) Int. Cl.
 *H01C 10/34* (2006.01)
 *H01C 1/02* (2006.01)

(52) U.S. Cl.
 CPC ............... *H01C 10/34* (2013.01); *H01C 1/02* (2013.01)

(58) Field of Classification Search
 CPC ........ H01C 10/34; H01C 1/02; H02K 11/042; H02K 3/32; H02K 11/04
 USPC ............................... 338/162; 310/68 B, 68 D
 See application file for complete search history.

(56) References Cited

U.S. PATENT DOCUMENTS

| | | | | |
|---|---|---|---|---|
| 2010/0283357 | A1* | 11/2010 | Lemmers, Jr. | H02K 11/042 310/68 D |
| 2014/0191624 | A1* | 7/2014 | Jahshan | H02K 35/02 310/68 B |
| 2018/0316248 | A1* | 11/2018 | Patel | H02M 7/003 |

* cited by examiner

*Primary Examiner* — Kyung S Lee
*Assistant Examiner* — Iman Malakooti
(74) *Attorney, Agent, or Firm* — Cantor Colburn LLP

(57) ABSTRACT

A resistor pack assembly comprising: a positive rail having a circular face; a negative rail having an inner circular face and an outer circular face located radially outward from inner circular face; an insulator ring having a first circular face and a second circular face opposite first circular face, the second circular face contacts the outer circular face of the negative rail; a first DC bus bar electrically connected to the insulator ring; a second DC bus bar electrically connected to negative rail; and a cylindrical suppression resistor having a first flat surface and a second flat surface opposite the first flat surface, the cylindrical suppression resistor is located radially inward of the insulator and axially between the positive rail and negative rail, wherein the first flat surface contacts the circular face of the positive rail and the second flat surface contacts the inner circular face of the negative rail.

20 Claims, 8 Drawing Sheets

HIGH SPEED ROTOR CONNECTION ASSEMBLY

BACKGROUND

The subject matter disclosed herein generally relates to generators, and more specifically to a rotating resistor pack employed in a generator.

A typical generator assembly includes a rotor portion and a stator portion. Mechanical energy is provided to the generator via a shaft connected to the rotor portion that is converted into electrical energy that is provided via the stator portion.

Many generators take advantage of three stages, including a permanent magnet stage, an exciter stage and a main stage. The exciter stage includes an exciter stator winding for receiving direct current (DC) power that energizes the exciter stator and generates the desired magnetic field. Rotational energy provided by the shaft causes the exciter rotor to move through the magnetic field, resulting in the generation of alternating current (AC) electric power in the exciter rotor. A rotating rectifier assembly is mounted within the rotor for converting the AC power to DC electric power that is supplied to the main rotor winding. The DC power provided to the rotating main rotor winding results in a rotating magnetic field that generates AC power in the stator windings.

Suppression resistors may also be included within or nearby the rotating rectifier assembly to provide an alternate path for voltage and current transients and protect the rotating rectifier assembly. However, the rotating rectifier assembly and the suppression resistors are mounted on the rotating shaft, and are therefore subject to the centrifugal forces associated with the rotating shaft.

BRIEF SUMMARY

According to one embodiment, a resistor pack assembly is provided. The resistor pack including: a positive rail having a circular face; a negative rail having an inner circular face and an outer circular face located radially outward from the inner circular face; an insulator ring having a first circular face and a second circular face opposite the first circular face, the second circular face contacts the outer circular face of the negative rail; a first DC bus bar electrically connected to the insulator ring; a second DC bus bar electrically connected to the negative rail; and a cylindrical suppression resistor having a first flat surface and a second flat surface opposite the first flat surface, the cylindrical suppression resistor is located radially inward of the insulator and axially between the positive rail and the negative rail, wherein the first flat surface contacts the circular face of the positive rail and the second flat surface contacts the inner circular face of the negative rail.

In addition to one or more of the features described above, or as an alternative, further embodiments may include that the first DC bus bar extends radially outward from the insulator ring.

In addition to one or more of the features described above, or as an alternative, further embodiments may include that the second DC bus bar extends radially outward from the negative rail.

In addition to one or more of the features described above, or as an alternative, further embodiments may include that the insulator ring includes a first bus bar reception cavity located on a radially outward surface of the insulator ring and extending into the insulator ring, the first DC bus bar being at least partially located within the first bus bar reception cavity.

In addition to one or more of the features described above, or as an alternative, further embodiments may include that the negative rail includes a second bus bar reception cavity located on a radially outward surface of the negative rail and extending into the negative rail, the second DC bus bar being at least partially located within the second bus bar reception cavity.

In addition to one or more of the features described above, or as an alternative, further embodiments may include that the insulator ring includes a projection portion that projects away from the second circular face and the negative rail includes a notch configured to receive the projection portion.

In addition to one or more of the features described above, or as an alternative, further embodiments may include that the insulator ring includes a projection portion that projects away from the second circular face and the negative rail includes a notch configured to receive the projection portion, and wherein the first bus bar reception cavity located on a radially outward surface of the projection portion of the insulator ring.

In addition to one or more of the features described above, or as an alternative, further embodiments may include that the positive rail includes a connection terminal and the insulator ring includes a receiving orifice located on the first circular face and extending into the insulator ring, the receiving orifice being configured to receive the connection terminal.

In addition to one or more of the features described above, or as an alternative, further embodiments may include that the receiving orifice is located on the first circular face opposite the projection portion.

In addition to one or more of the features described above, or as an alternative, further embodiments may include that the positive rail includes a connection terminal and the insulator ring includes a receiving orifice located on the first circular face and extending into the insulator ring, the receiving orifice being configured to receive the connection terminal.

In addition to one or more of the features described above, or as an alternative, further embodiments may include: a connection orifice that extends through the positive rail and the insulator ring; and a power band located within the connection orifice within the positive rail.

In addition to one or more of the features described above, or as an alternative, further embodiments may include: a connection orifice that extends through the insulator ring and the negative rail; and a power band located within the connection orifice within the negative rail.

In addition to one or more of the features described above, or as an alternative, further embodiments may include: a housing having an internal cavity and a first face, wherein the positive rail and the cylindrical suppression resistor are at least partially located within the internal cavity and the first circular face of the insulator ring contacts the first face of the housing.

In addition to one or more of the features described above, or as an alternative, further embodiments may include: a resistor housing washer having a plurality of apertures for receiving a fastener, the plurality of apertures in the resistor housing washer align with a plurality of apertures in the housing, a plurality of apertures in the insulator ring, and a plurality of apertures in the negative rail.

According to another embodiment, a generator having a plurality of rotating components that rectify an alternating current (AC) voltage to a direct current (DC) voltage supplied to main field windings is provided. The generator including: a rotor shaft having an inner diameter; a rectifier assembly located within the inner diameter of the rotor shaft and connected to convert the AC voltage to a rectified DC voltage supplied via a first round contact bus bar that extends axially away from the rectifier assembly and a second round contact bus bar that extends axially away from the rectifier assembly; and a resistor pack assembly located axially adjacent to the rectifier assembly and within the inner diameter of the rotor shaft, wherein the resistor pack assembly receives the DC voltage supplied by the first round contact bus bar and the second round contact bus bar, wherein the resistor pack assembly communicates the DC voltage to a main field winding, and wherein the resistor pack assembly includes: a positive rail having a circular face; a negative rail having an inner circular face and an outer circular face located radially outward from the inner circular face; an insulator ring having a first circular face and a second circular face opposite the first circular face, the second circular face contacts the outer circular face of the negative rail; a first DC bus bar electrically connected to the insulator ring; a second DC bus bar electrically connected to the negative rail; and a cylindrical suppression resistor having a first flat surface and a second flat surface opposite the first flat surface, the cylindrical suppression resistor is located radially inward of the insulator and axially between the positive rail and the negative rail, wherein the first flat surface contacts the circular face of the positive rail and the second flat surface contacts the inner circular face of the negative rail.

In addition to one or more of the features described above, or as an alternative, further embodiments may include that the first DC bus bar extends radially outward from the insulator ring and is electrically connected to the main field winding.

In addition to one or more of the features described above, or as an alternative, further embodiments may include that the second DC bus bar extends radially outward from the negative rail and is electrically connected to the main field winding.

In addition to one or more of the features described above, or as an alternative, further embodiments may include that the insulator ring includes a first bus bar reception cavity located on a radially outward surface of the insulator ring and extending into the insulator ring, the first DC bus bar being at least partially located within the first bus bar reception cavity.

In addition to one or more of the features described above, or as an alternative, further embodiments may include that the negative rail includes a second bus bar reception cavity located on a radially outward surface of the negative rail and extending into the negative rail, the second DC bus bar being at least partially located within the second bus bar reception cavity.

In addition to one or more of the features described above, or as an alternative, further embodiments may include that the insulator ring includes a projection portion that projects away from the second circular face and the negative rail includes a notch configured to receive the projection portion.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
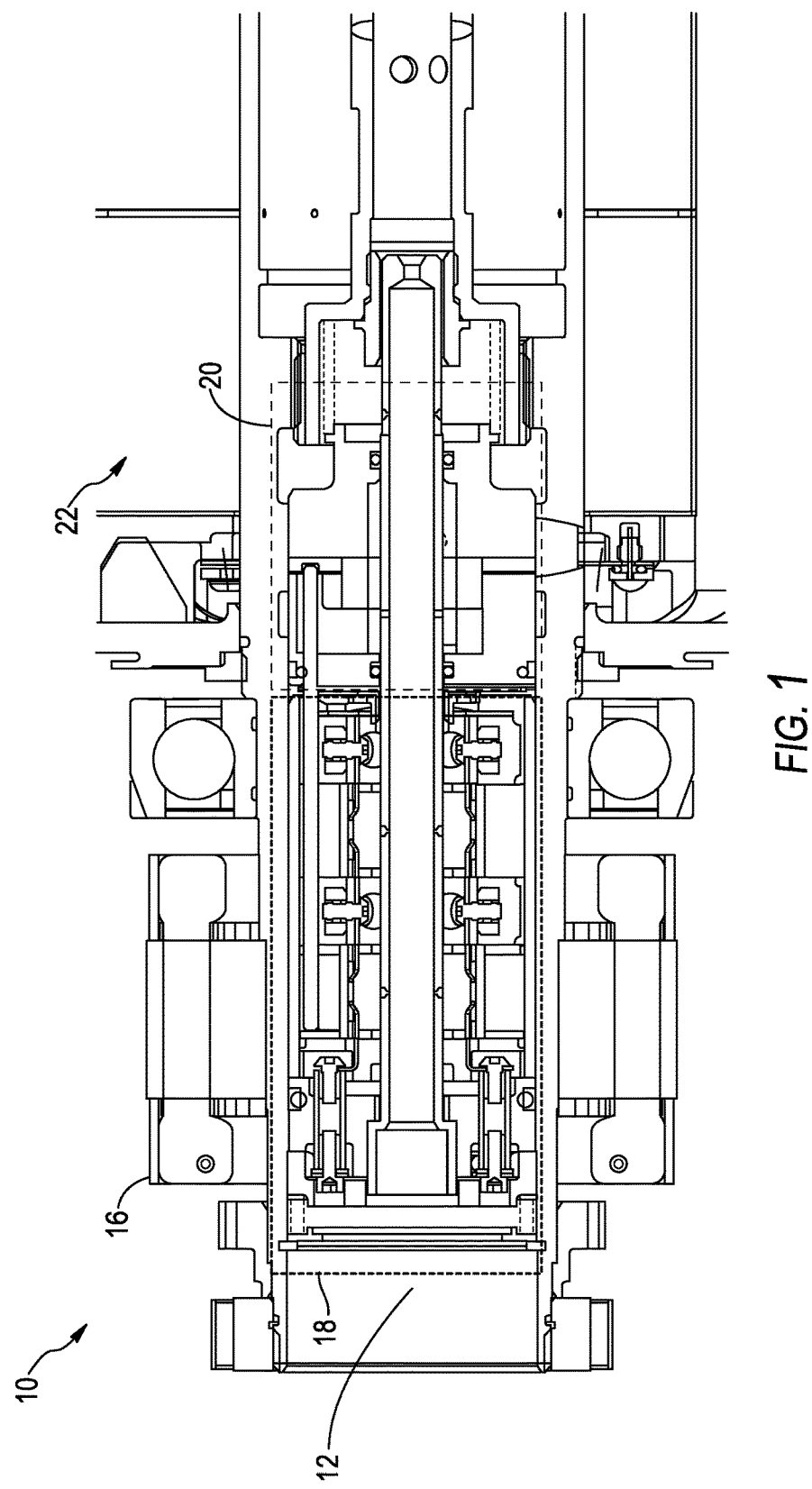
FIG. 1 is a cross-sectional view of rotating components included in a variable frequency generator, according to an embodiment of the present disclosure.

Referring now to FIG. 1, a cross-sectional view of rotating components included in generator 10, according to an embodiment of the present disclosure. The generator 10 includes a rotor shaft 12, an exciter rotor 16, a rectifier assembly 18, a resistor pack 20, and a main field winding 22. The rotor shaft 12 communicates mechanical energy to the rotating components mounted on the shaft, including the exciter rotor 16, the rectifier assembly 18, the resistor pack 20, and the main field winding 22.

DC voltage is supplied to the stator windings (not shown) located adjacent to the exciter rotor 16. The exciter rotor 16 rotates with the rotor shaft 12, and generates an alternating current (AC) voltage in response to a magnetic field generated by an exciter stator (not shown) located adjacent to the exciter rotor 16. The AC voltage is supplied to the rectifier assembly 18, which rectifies the AC voltage to a rectified DC voltage. The resistor pack 20 receives the rectified DC voltage, and communicates the rectified DC voltage to the main field winding 22.

Both the rectifier assembly 18 and the resistor pack 20 are mounted within an inner diameter of the rotor shaft 12, and are therefore subjected to centrifugal forces associated with the rotation of the rotor shaft 12. A benefit of locating the rectifier assembly 18 and the resistor pack 20 within the inner diameter of the rotor shaft 12, is the rectifier assembly 18 and the resistor pack 20 are structurally supported by the rotor shaft 12. Locating components within the inner diameter (ID) of the rotor shaft 12 forces the rotor shaft 12 to a certain size to accommodate the components and adds to the stiffness of the rotor shaft 12. Increased shaft stiffness increases a maximum obtainable speed of the rotor shaft 12.

Figure 2:
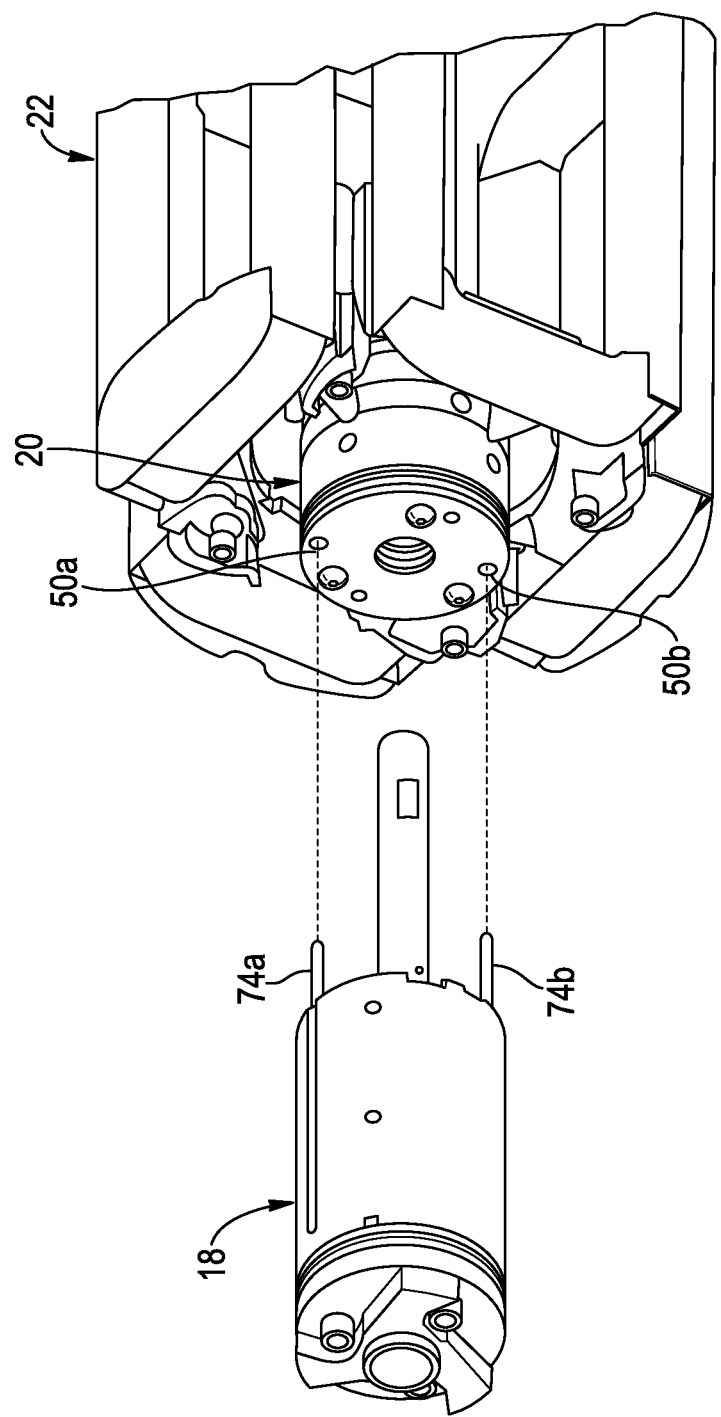
FIG. 2 is an exploded view that illustrates the connection of a rectifier assembly to a resistor pack assembly of the variable frequency generator of FIG. 1, according to an embodiment of the present disclosure.

Referring now to FIG. 2, with continued reference to FIG. 1, an exploded view that illustrates the connection of the rectifier assembly 18 to the resistor pack assembly 20 is shown, according to an embodiment of the present disclosure. In the embodiment shown in FIG. 2, the resistor pack assembly 20 is shown mounted within main field winding 22, but with the rotor shaft 12 removed from the view to prevent obscuration of the resistor pack assembly 20. The rectifier assembly 18 includes a first round contact bus bar 74a and a second round contact bus bar 74b extending axially away from rectifier assembly 18. As described below, the first round contact bus bar 74a and the second round contact bus bar 74b are received by power bands (e.g., power band 70 and power band 73 shown in FIG. 5) located within connection orifices 50a and 50b, respectively.

Figure 3:
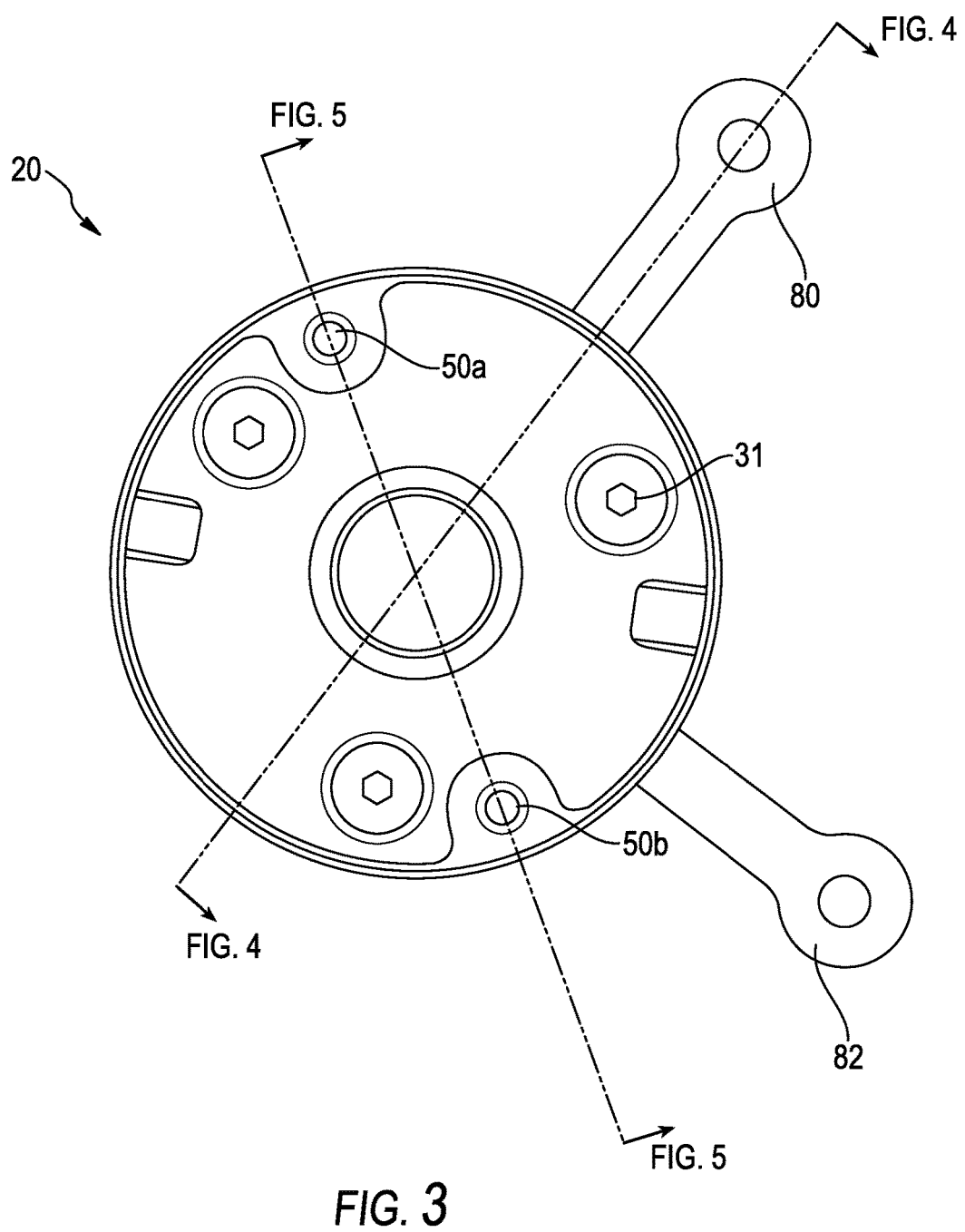
FIG. 3 is an axial view the resistor pack assembly, according to an embodiment of the present disclosure.

Referring now to FIG. 3, with continued reference to FIGS. 1-2, an axial view of the resistor pack assembly 20 is illustrated, in accordance with an embodiment of the present discloser. In the embodiment shown in FIG. 3, the resistor pack assembly 20 includes a first DC bus bar 80 and a second DC bus bar 82. The first DC bus bar 80 and the second DC bus bar 82 electrically connects to the main field winding 22. Also visible in FIG. 3 are fasteners 31 utilized to press the components of the resistor pack assembly 20 into abutment with one another, securing those components that are not fastened, as discussed further below.

Figure 4:
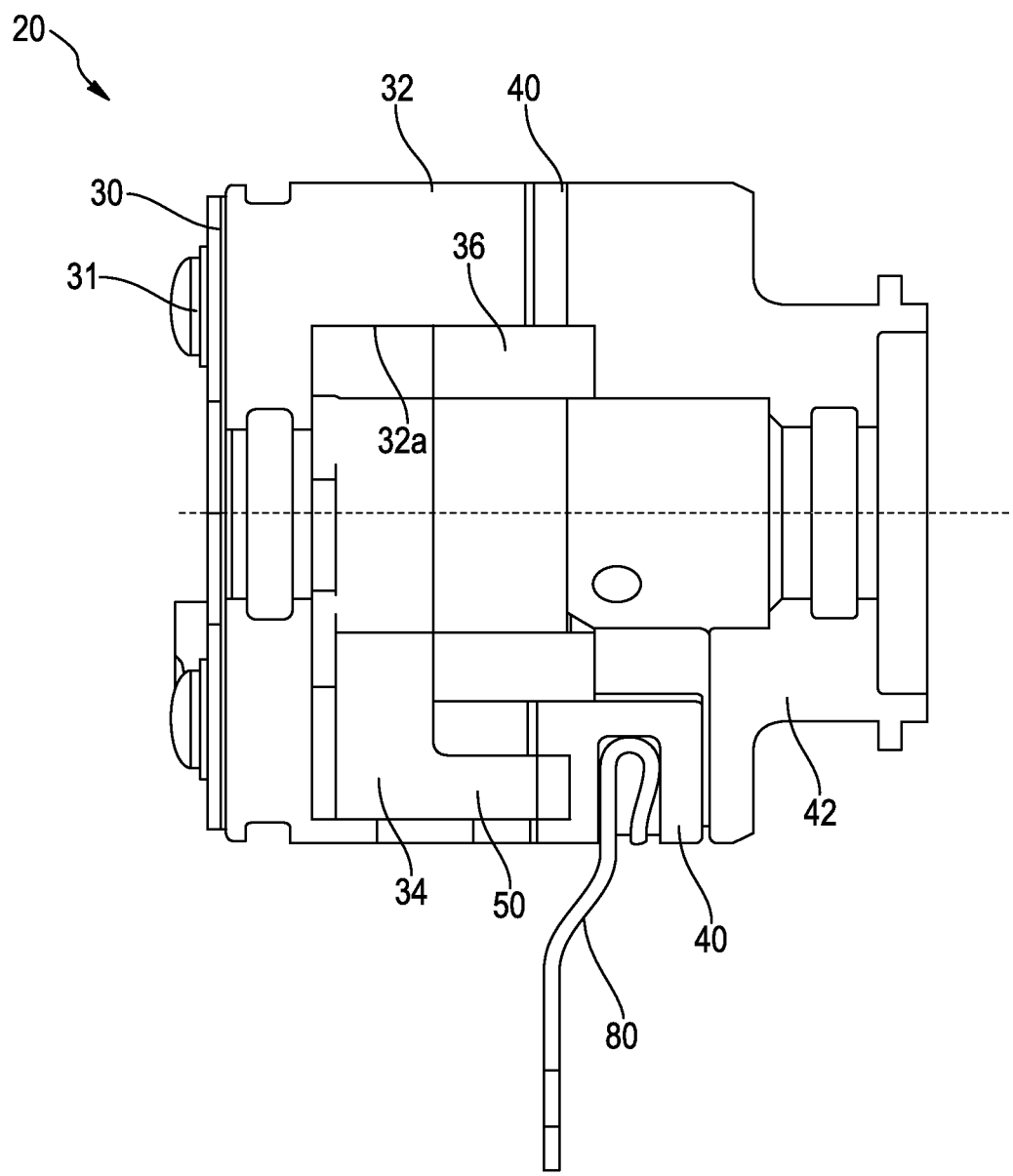
FIG. 4 is an cross-sectional view the resistor pack assembly, according to an embodiment of the present disclosure.

Referring now to FIG. 4, with continued FIG. 1-3, a cross-sectional view of the resistor pack assembly 20 is illustrated, according to an embodiment of the present disclosure. The resistor pack assembly 20 includes a resistor housing washer 30, a housing 32, a positive rail 34, a cylindrical suppression resistor 36, an insulator ring 40, and a negative rail 42. The negative rail 42 also serves as a structural base for the resistor pack assembly 20. Components included within resistor pack assembly 20 are sandwiched in place between resistor housing washer 30 and negative rail 42. In particular, cylindrical suppression resistor 36 is at least partially located within an internal cavity 32a of the housing 32 interposed between the positive rail 34 and the negative rail 42. The housing 32 structurally supports the cylindrical suppression resistor 36. The positive rail 34 is also at least partially located within the internal cavity 32a of the housing 32. The housing 32 also electrically separates the cylindrical suppression resistor 36 and the positive rail 34 from rotor shaft 12 (shown in FIG. 1).

The suppression resistor 36 provides a ground fault path through rotor shaft 12 that prevents a build-up of charge on the main field windings that can damage the diodes in rectifier assembly 18 when discharged. In the embodiment, the suppression resistor 36 is a ceramic resistor, although in other embodiments various materials may be employed.

The resistor pack assembly 20 is held in place via fasteners 31 (e.g., bolts) connected through the resistor housing washer 30, the housing 32, the insulator ring 40, and the negative rail 42. In this way, cylindrical suppression resistor 36 is held in place between the positive rail 34 and the negative rail 42.

Figure 5:
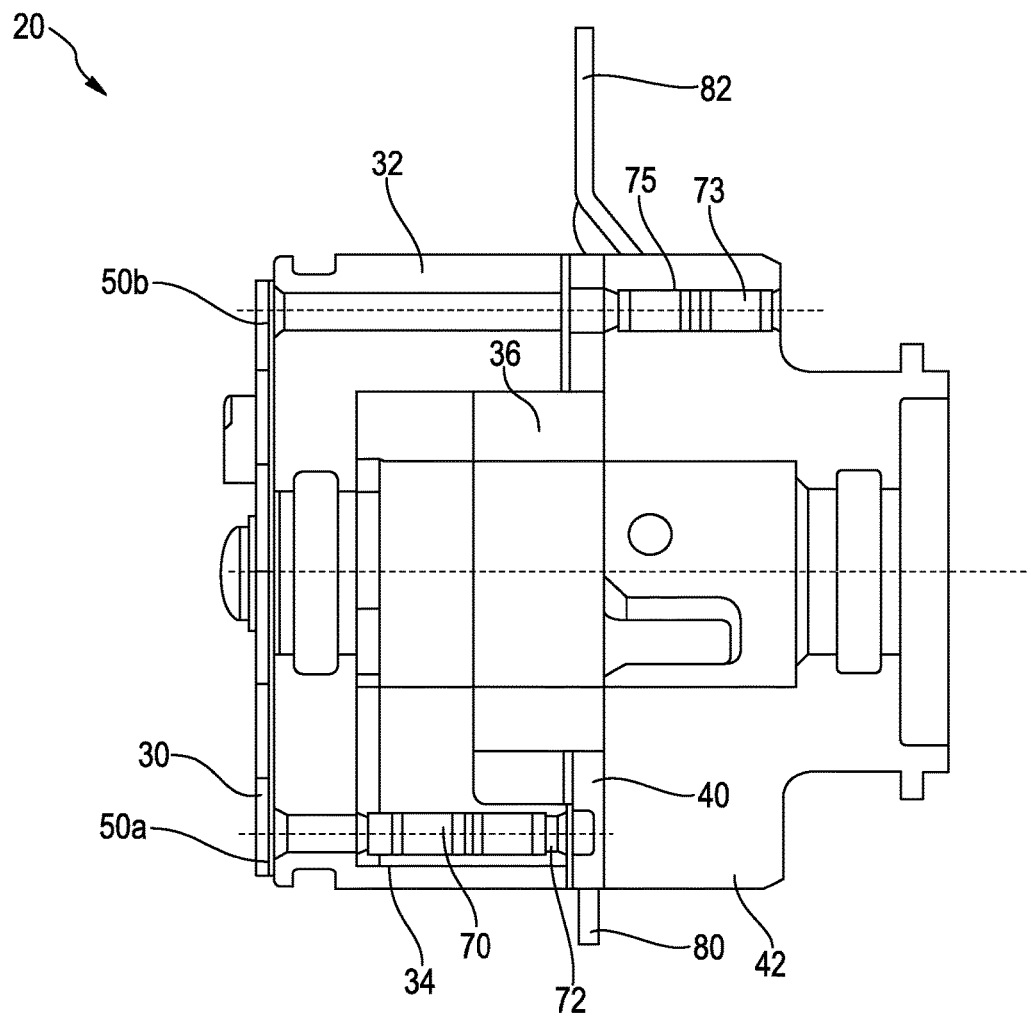
FIG. 5 is an cross-sectional view the resistor pack assembly, according to an embodiment of the present disclosure.

Referring now to FIG. 5, with continued FIG. 1-4, a cross-sectional view of the resistor pack assembly 20 is illustrated, according to an embodiment of the present disclosure. The resistor pack assembly 20 once again includes the resistor housing washer 30, the housing 32, the positive rail 34, the cylindrical suppression resistor 36, the insulator ring 40, and the negative rail 42.

FIG. 5 illustrates the placement of power band 70 within the connection orifice 50a. The connection orifice 50a extends through the resistor housing washer 30, the housing 32, the positive rail 34, and the insulator ring 40, as shown in FIG. 5. The power band 70 is a hollow sleeve that fits within the sleeve-like aperture (e.g., sleeve) 72 of the connection orifice 50a. The sleeve-like aperture 50a is located in the positive rail 34. The power band 70 is a conductor that is configured to receive the first round contact bus bar 74a (shown in FIG. 2) associated with rectifier assembly 18. The axial extending connection orifice 50a with the power band 70 allows the rectifier assembly 18 to be electrically connected to the resistor pack 20 simply by sliding the first round contact bus bar 74a (shown in FIG. 2) into engagement with power band 70.

FIG. 5 also illustrates the placement of power band 73 within connection orifice 50b. The connection orifice 50a extends through the resistor housing washer 30, the housing 32, the insulator ring 40, and the negative rail 42, as shown in FIG. 5. The power band 73 is a hollow sleeve that fits within the sleeve-like aperture (e.g., sleeve) 75 of the connection orifice 50b. The sleeve-like aperture 75 is located in the negative rail 42. The power band 73 is a conductor that is configured to receive the second round contact bus bar 74b (shown in FIG. 2) associated with rectifier assembly 18. The axial extending connection orifice 50b with the power band 73 allows the rectifier assembly 18 to be electrically connected to the resistor pack 20 simply by sliding the second round contact bus bar 74b (shown in FIG. 2) into engagement with power band 73.

Figure 6:
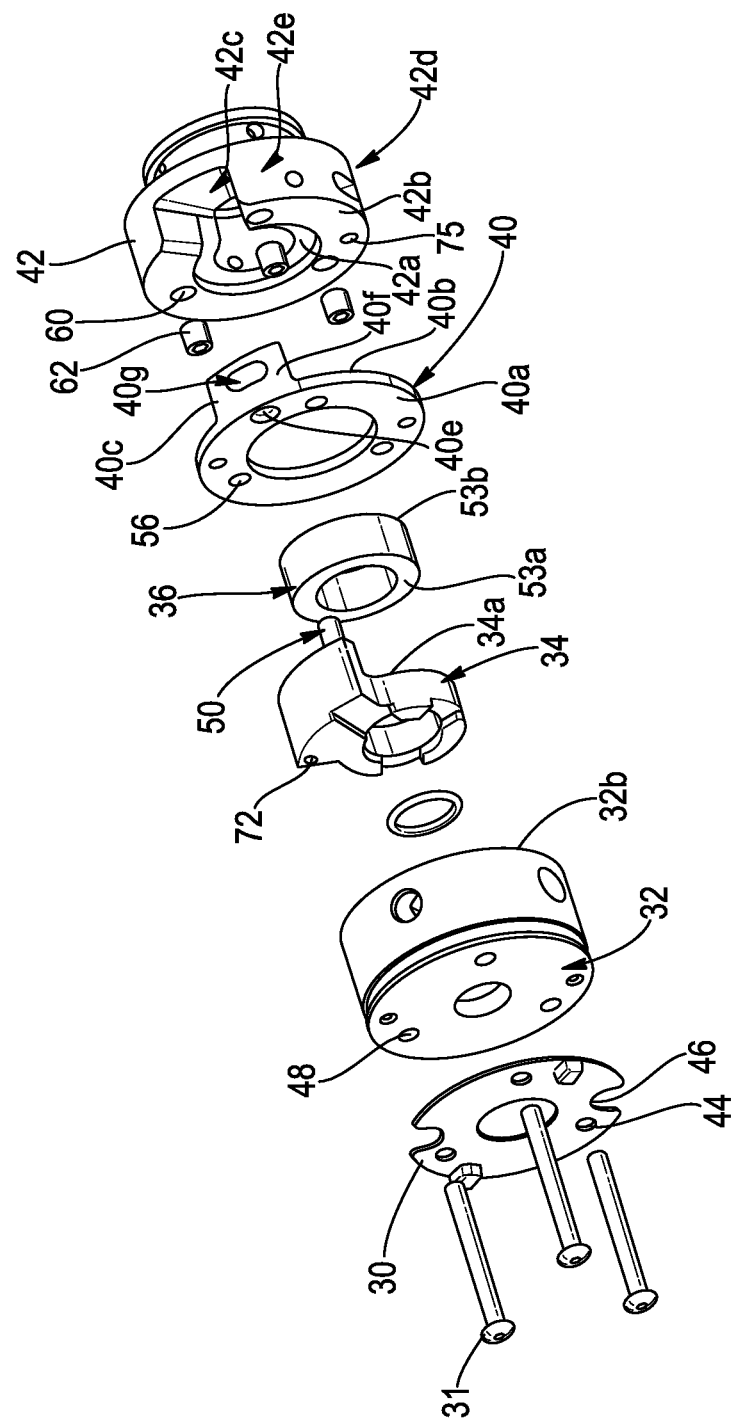
FIG. 6 is an exploded view the resistor pack assembly, according to an embodiment of the present disclosure.

Referring now to FIG. 6, with continued reference to FIGS. 1-5, an exploded view of resistor pack assembly 20 is illustrated, according to an embodiment of the present disclosure. In the embodiment shown in FIG. 6, the resistor pack assembly 20 once again includes the resistor housing washer 30, the housing 32, the positive rail 34, the cylindrical suppression resistor 36, the insulator ring 40, and the negative rail 42.

The resistor housing washer 30 includes a plurality of apertures 44 for receiving fasteners 31 (e.g., bolts) for securing components of the resistor pack assembly 20 together. In addition, the resistor housing washer 30 includes apertures or openings 46 for receiving the first round contact bus bar 74a and the second contact bus bar 74b (shown in FIG. 2) associated with rectifier assembly 18. The housing 32 is located adjacent to the resistor housing washer 30 and also includes a plurality of apertures 48 for receiving fasteners 31 and/or the first round contact bus bar 74a and the second contact bus bar 74b (shown in FIG. 2) associated with the rectifier assembly 18.

The positive rail 34 is located adjacent to the housing 32, and includes a circular face 34a and a connection terminal 50. The positive rail 34 is also located partially within the housing 32, as shown in FIG. 2. The connection terminal 50 extends axially away from the circular face 34a of the positive rail 34. The positive rail 34 also includes the sleeve-like aperture (e.g., sleeve) 72 of the connection orifice 50a, as discussed in relation to FIG. 5 above.

The cylindrical suppression resistor 36 is located between the positive rail 34 and the negative rail 42, as shown in FIGS. 4-6. The cylindrical suppression resistor 36 includes a first flat surface 53a and second flat surface 53b. In the embodiment shown in FIG. 3, cylindrical suppression resistor 36 is cylindrical, and does not include apertures for receiving a fastener 51. Rather, cylindrical suppression resistor 36 is sandwiched in place between the circular face 34a of the positive rail 34 and an inner circular face 42a of the negative rail 42. In addition, the contact between the circular face 34a and the first flat surface 53a of the cylindrical suppression resistor 36 provides an electrical connection between the positive rail 34 and cylindrical suppression resistor 36.

The insulator ring 40 is located adjacent to the housing 32 and the negative rail 42. The insulator ring 40 includes a first circular face 40a and a second circular face 40b opposite the first circular face 40a. The first face 40 contacts a first face 32b of the housing 32 and the second circular face 40b contacts an outer circular face 42b of the negative rail 42. The outer circular face 42b of the negative rail 42 is located radially outward from the inner circular face 42a. The cylindrical suppression resistor 36 is located radially inward from the insulator ring 40, as shown in FIG. 2.

The insulator ring 40 includes a plurality of apertures 56 for receiving the fasteners 31 provided through the resistor housing washer 30, and the housing 32. The fasteners 31 are secured to the negative rail 42 and press the components of resistor pack assembly 20 into abutment with one another, securing those components that are not fastened.

The insulator ring 40 includes a projection portion 40c that projects away from the second circular face 40b. The projection portion 40c mates with a notch 42c located in the negative rail 42 when the components of resistor pack assembly 20 are pressed into abutment with one another. The notch 42c is configured to receive the projection portion 40c. The insulator ring 40 also includes a first bus bar reception cavity 40g located on a radially outward surface 40f of the projection portion 40c. In an embodiment, the first bus bar reception cavity 40g is a positive rail/terminal/reception point and the second bus bar reception cavity 42d is a negative rail/terminal/reception point. The first bus bar reception cavity 40g is configured to receive a first DC bus bar 80 (see FIGS. 2 and 4). The first DC bus bar 80 is secured within the first bus bar reception cavity 40g. The first DC bus bar 80 is at least partially located within the first bus bar reception cavity 40g. The first bus bar reception cavity 40 electrically connects the insulator ring 40 to the first DC bus bar 80.

The insulator ring 40 also includes a receiving orifice 40e located on the first circular face 40a and extending into the insulator ring 40. The receiving orifice 40e is configured to receive the connection terminal 50 of the positive rail 34 when the components of resistor pack assembly 20 are pressed into abutment with one another. The receiving orifice 40e originates on the first circular face 40a and extends into the insulator ring 40 toward the projection portion 40c. Advantageously, by locating the receiving orifice 40e opposite the projection portion 40c increases dielectric separation. The electrical current does not flow through the insulator ring 40. The electrical current in the resistor pack assembly 20 flows from the first round contact bus bar 74a to the negative rail 42 to the second DC bus bar 82 to the main field winding 22 to the first DC bus bar 80 to the second round contact bus bar 74b.

The negative rail 42 is located adjacent to the insulator ring 40 and the cylindrical suppression resistor 36. The negative rail 42 provides an electrical path to ground (typically a high resistance). In an embodiment, the rotor shaft 12 is grounded, and the negative rail 42 provides an electrical path to rotor shaft 12 to prevent an undesirable build-up of charge within rectifier assembly 18. The negative rail 42 may be composed of a material, such as, for example aluminum alloy, copper alloy, beryllium copper, or aluminum copper alloys. The negative rail 42 also includes the sleeve-like aperture (e.g., sleeve) 75 of the connection orifice 50b, as discussed in relation to FIG. 5 above.

The negative rail 42 also includes a second bus bar reception cavity 42d located on a radially outward surface 42e of the negative rail 42 and extends into the negative rail 42. The second bus bar reception cavity 42d is configured to receive a second DC bus bar 82 (see FIGS. 3 and 5). The second DC bus bar 82 is secured within the second bus bar reception cavity 42d. The second DC bus bar 82 is at least partially located within the second bus bar reception cavity 42d. The second bus bar reception cavity 42d electrically connects the negative rail 42 to the second DC bus bar 82.

The negative rail 42 includes a plurality of apertures 60 for receiving the fasteners 31 provided through the resistor housing washer 30, the housing 32, and insulator ring 40. The fasteners 31 secured to the negative rail 42 and press the components of the resistor pack assembly 20 into abutment with one another, securing those components that are not fastened. The fasteners 31 may be secured to the negative rail 42 via anchors 62 located in the apertures 60. In an embodiment, the anchors 62 may be helical inserts or a threaded insert such as a Keensert. The plurality of apertures 44 in the resistor housing washer 30 align with the plurality of apertures 48 in the housing 32, the plurality of apertures 56 in the insulator ring 40, and the plurality of apertures 60 in the negative rail 42. The fasteners 31 are located within the plurality of apertures 44 in the resistor housing washer 30, the plurality of apertures 48 in the housing 32, the plurality of apertures 56 in the insulator ring 40, and the plurality of apertures 60 in the negative rail 42.

Figure 7:
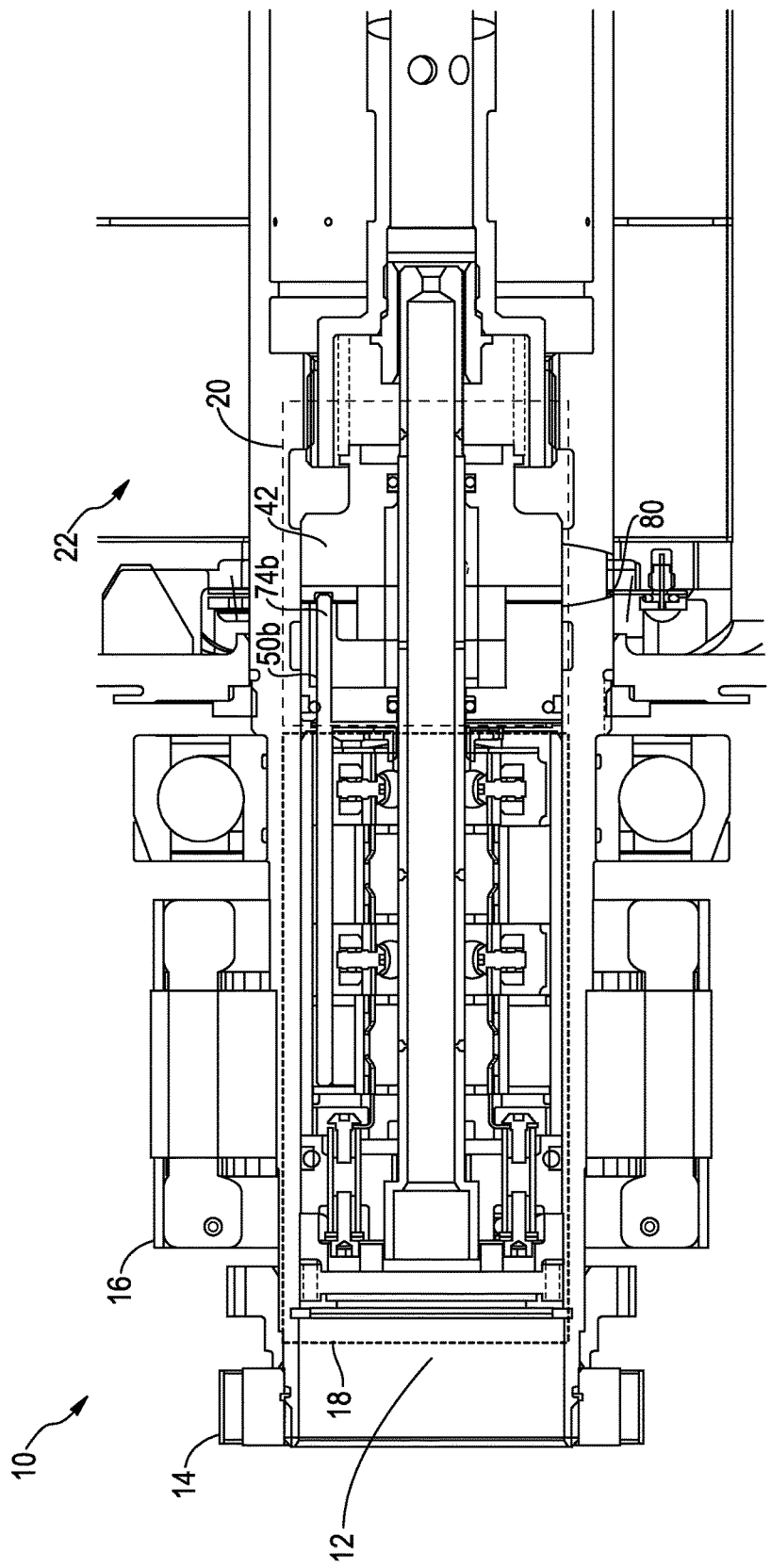
FIG. 7 is a cross-sectional view of rotating components included in a variable frequency generator, according to an embodiment of the present disclosure

Referring now to FIG. 7, with continued reference to FIG. 1-6, a cross-sectional view of the assembled connection of the rectifier assembly 18 to the resistor pack assembly 20 is illustrated, according to an embodiment of the present disclosure. In particular, FIG. 7 illustrates the engagement of the round contact bus bar 74b associated with the rectifier assembly 18 into the connection orifice 50b. The round contact bus bar 74b extends away from the rectifier assembly 18 and engages the connection orifice 50b, making contact with the power band 73 (not shown in this view) located within the connection orifice 50b. Likewise, although not shown in FIG. 7, the round contact bus bar 74a extends away from the rectifier assembly 18 and engages the connection orifice 50a, making contact with the power band 70 located within the connection orifice 50b, as discussed above.

In addition, the round contact bus bar 74b extends through the connection orifice 50b and is engaged within the negative rail 42. The purpose of extending the round contact bus bar 74b to make contact with the negative rail 42 is to provide an electrical path between the rectifier assembly 18 and ground (in this case, rotor shaft 12 is grounded). The grounded path allows built up static charge on the main field windings to safely discharge in a controlled manner. A ground path with resistance limits the amount of static charge that can build up prior to discharge.

FIG. 7 also illustrates the first DC bus bar 80 extending from resistor pack assembly 20 to main field winding 22. In the embodiment shown in FIG. 7, the first DC bus bar 80 extends radially outward from the resistor pack assembly 20. The first DC bus bar 80 is attached via a nut 82a to main field winding 22.

Figure 8:
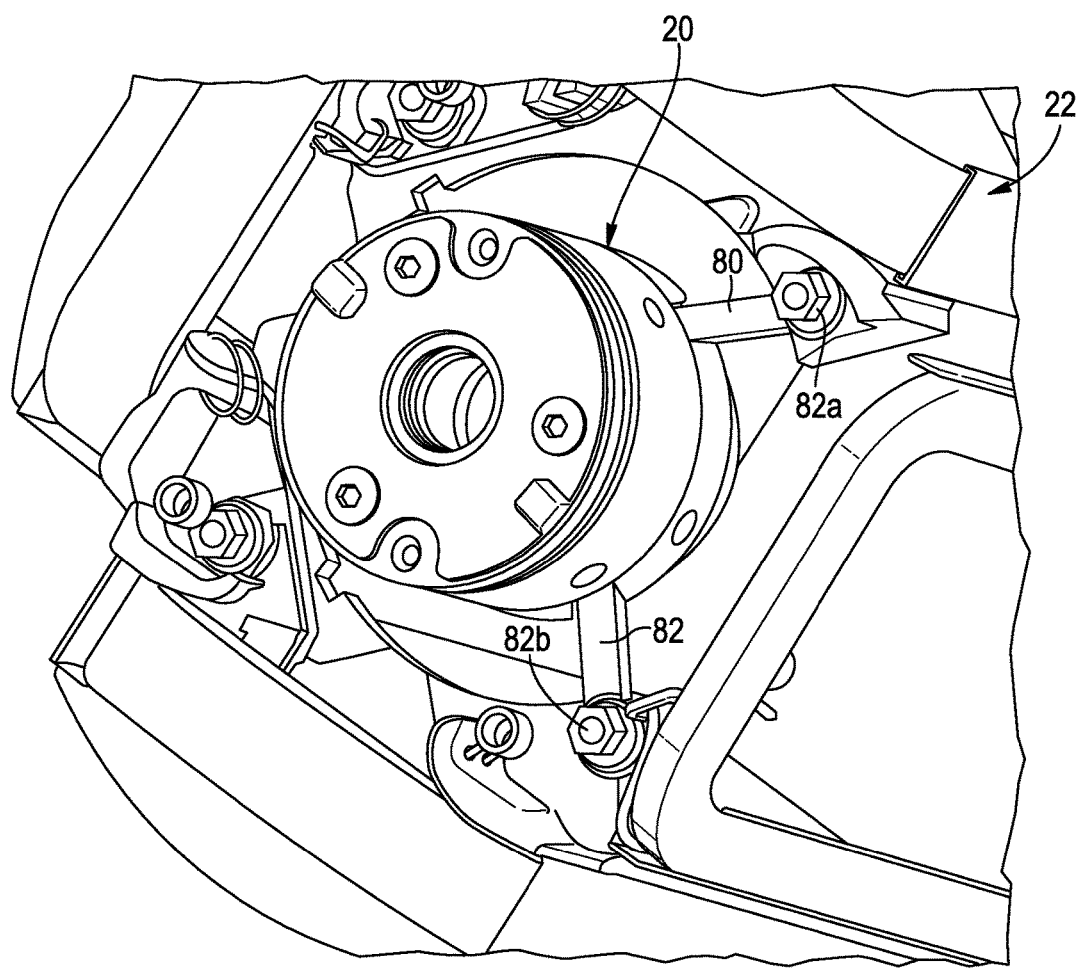
FIG. 8 is an orthogonal view of the assembled connection of the resistor pack assembly to the rotor field winding, according to an embodiment of the present disclosure.

Referring now to FIG. 8, with continued reference to FIG. 1-7, an orthogonal view of the resistor pack assembly 20 mounted within main field winding 22 is illustrated, in accordance with an embodiment of the present disclosure. The first DC bus bar 80 and the second DC bus bar 82 are illustrated extending radially outward from the resistor pack assembly 20. The first DC bus bar 80 is secured to the main field winding 22 via the first nut 82a and the second DC bus bar 82 is secured to the main field winding 22 via the second nut 82b, respectively, for electrical connection to the main field winding 22.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A resistor pack assembly comprising:
    a positive rail having a circular face;
    a negative rail having an inner circular face and an outer circular face located radially outward from the inner circular face;
    an insulator ring having a first circular face and a second circular face opposite the first circular face, the second circular face contacts the outer circular face of the negative rail;
    a first DC bus bar electrically connected to the insulator ring;
    a second DC bus bar electrically connected to the negative rail; and
    a cylindrical suppression resistor having a first flat surface and a second flat surface opposite the first flat surface, the cylindrical suppression resistor is located radially inward of the insulator and axially between the positive rail and the negative rail, wherein the first flat surface contacts the circular face of the positive rail and the second flat surface contacts the inner circular face of the negative rail.

2. The resistor pack assembly of claim 1, wherein the first DC bus bar extends radially outward from the insulator ring.

3. The resistor pack assembly of claim 1, wherein the second DC bus bar extends radially outward from the negative rail.

4. The resistor pack assembly of claim 1, wherein the insulator ring includes a first bus bar reception cavity located on a radially outward surface of the insulator ring and extending into the insulator ring, the first DC bus bar being at least partially located within the first bus bar reception cavity.

5. The resistor pack assembly of claim 1, wherein the negative rail includes a second bus bar reception cavity located on a radially outward surface of the negative rail and extending into the negative rail, the second DC bus bar being at least partially located within the second bus bar reception cavity.

6. The resistor pack assembly of claim 1, wherein the insulator ring includes a projection portion that projects away from the second circular face and the negative rail includes a notch configured to receive the projection portion.

7. The resistor pack assembly of claim 4, wherein the insulator ring includes a projection portion that projects away from the second circular face and the negative rail includes a notch configured to receive the projection portion, and wherein the first bus bar reception cavity located on a radially outward surface of the projection portion of the insulator ring.

8. The resistor pack assembly of claim 7, wherein the positive rail includes a connection terminal and the insulator ring includes a receiving orifice located on the first circular face and extending into the insulator ring, the receiving orifice being configured to receive the connection terminal.

9. The resistor pack assembly of claim 8, wherein the receiving orifice is located on the first circular face opposite the projection portion.

10. The resistor pack assembly of claim 1, wherein the positive rail includes a connection terminal and the insulator ring includes a receiving orifice located on the first circular face and extending into the insulator ring, the receiving orifice being configured to receive the connection terminal.

11. The resistor pack assembly of claim 1, further comprising:
    a connection orifice that extends through the positive rail and the insulator ring; and
    a power band located within the connection orifice within the positive rail.

12. The resistor pack assembly of claim 1, further comprising:
    a connection orifice that extends through the insulator ring and the negative rail; and
    a power band located within the connection orifice within the negative rail.

13. The resistor pack assembly of claim 1, further comprising:
    a housing having an internal cavity and a first face, wherein the positive rail and the cylindrical suppression resistor are at least partially located within the internal cavity and the first circular face of the insulator ring contacts the first face of the housing.

14. The resistor pack assembly of claim 13, further comprising:
    a resistor housing washer having a plurality of apertures for receiving a fastener, the plurality of apertures in the resistor housing washer align with a plurality of apertures in the housing, a plurality of apertures in the insulator ring, and a plurality of apertures in the negative rail.

15. A generator having a plurality of rotating components that rectify an alternating current (AC) voltage to a direct current (DC) voltage supplied to main field windings, the generator comprising:
    a rotor shaft having an inner diameter;
    a rectifier assembly located within the inner diameter of the rotor shaft and connected to convert the AC voltage to a rectified DC voltage supplied via a first round contact bus bar that extends axially away from the rectifier assembly and a second round contact bus bar that extends axially away from the rectifier assembly; and a resistor pack assembly located axially adjacent to the rectifier assembly and within the inner diameter of the rotor shaft, wherein the resistor pack assembly receives the DC voltage supplied by the first round contact bus bar and the second round contact bus bar, wherein the resistor pack assembly communicates the DC voltage to a main field winding, and wherein the resistor pack assembly comprises:
a positive rail having a circular face;
a negative rail having an inner circular face and an outer circular face located radially outward from the inner circular face;
an insulator ring having a first circular face and a second circular face opposite the first circular face, the second circular face contacts the outer circular face of the negative rail;
a first DC bus bar electrically connected to the insulator ring;
a second DC bus bar electrically connected to the negative rail; and
a cylindrical suppression resistor having a first flat surface and a second flat surface opposite the first flat surface, the cylindrical suppression resistor is located radially inward of the insulator and axially between the positive rail and the negative rail, wherein the first flat surface contacts the circular face of the positive rail and the second flat surface contacts the inner circular face of the negative rail.

16. The generator of claim 15, wherein the first DC bus bar extends radially outward from the insulator ring and is electrically connected to the main field winding.

17. The generator of claim 15, wherein the second DC bus bar extends radially outward from the negative rail and is electrically connected to the main field winding.

18. The generator of claim 15, wherein the insulator ring includes a first bus bar reception cavity located on a radially outward surface of the insulator ring and extending into the insulator ring, the first DC bus bar being at least partially located within the first bus bar reception cavity.

19. The generator of claim 15, wherein the negative rail includes a second bus bar reception cavity located on a radially outward surface of the negative rail and extending into the negative rail, the second DC bus bar being at least partially located within the second bus bar reception cavity.

20. The generator of claim 15, wherein the insulator ring includes a projection portion that projects away from the second circular face and the negative rail includes a notch configured to receive the projection portion.

* * * * *